United States Patent
Kii

(10) Patent No.: US 7,617,301 B2
(45) Date of Patent: Nov. 10, 2009

(54) DIALOGUE APPARATUS FOR CONTROLLING DIALOGUES BASED ON ACQUIRED INFORMATION, JUDGMENT RESULT, TIME ESTIMATION AND RESULT TRANSMISSION

(75) Inventor: Takahiro Kii, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 631 days.

(21) Appl. No.: 11/132,324

(22) Filed: May 19, 2005

(65) Prior Publication Data

US 2005/0209856 A1 Sep. 22, 2005

Related U.S. Application Data

(63) Continuation of application No. PCT/JP03/04731, filed on Apr. 14, 2003.

(51) Int. Cl.
G06F 15/16 (2006.01)
G10L 11/00 (2006.01)
(52) U.S. Cl. .................. 709/221; 709/223; 704/270
(58) Field of Classification Search ............. 705/5, 705/6, 1, 28, 26, 27; 709/204, 206–207, 709/217–219; 718/103, 107, 758; 725/40, 725/39, 37, 32, 22; 715/733; 704/270
See application file for complete search history.

(56) References Cited

U.S. PATENT DOCUMENTS

| 5,884,032 | A  | * | 3/1999  | Bateman et al. ............. 709/204 |
| 5,884,034 | A  | * | 3/1999  | Ohishi et al. ................ 709/206 |
| 6,137,489 | A  | * | 10/2000 | Ohishi et al. ................ 715/733 |
| 6,389,132 | B1 | * | 5/2002  | Price ....................... 379/265.01 |
| 6,502,076 | B1 | * | 12/2002 | Smith .......................... 705/14 |
| 6,768,863 | B2 | * | 7/2004  | Ando et al. ................... 386/95 |
| 2003/0135629 | A1 | * | 7/2003 | Sasaki et al. ................ 709/229 |
| 2004/0189697 | A1 | * | 9/2004 | Fukuoka et al. ............. 345/748 |
| 2007/0094111 | A1 | * | 4/2007 | Carrion ....................... 705/35 |

FOREIGN PATENT DOCUMENTS

JP 62-286147 12/1987

(Continued)

OTHER PUBLICATIONS

A dialogue-based approach to the design of user interfaces for supervisory control systems, Bartram, L.; Ovans, R.; Systems, Man and Cybernetics, 1995. Intelligent Systems for the 21st Century., IEEE International Conference on vol. 4, Oct. 22-25, 1995 pp. 3144-3149 vol. 4 Digital Object Identifier 10.1109/ICSMC.1995.538266.*

(Continued)

Primary Examiner—David R Vincent
Assistant Examiner—Ola Olude-Afolabi
(74) Attorney, Agent, or Firm—Westerman, Hattori, Daniels & Adrian, LLP

(57) ABSTRACT

The user's waiting time in a dialogue system is effectively utilized. A dialogue apparatus makes a first dialogue with a user and judges whether a second dialogue should be started when a user's waiting time occurs during the first dialogue, For example, when information necessary to further continue the first dialogue is acquired via a network during the first dialogue, a waiting time occurs, If the waiting time is expected to be long, the second dialogue is made during the first waiting time, After this dialogue ends, the first dialogue is resumed, Thus, the waiting time during the dialogue becomes shorter, so that the connection time is effectively utilized.

7 Claims, 13 Drawing Sheets

FOREIGN PATENT DOCUMENTS

| | | |
|---|---|---|
| JP | 2-162453 | 6/1990 |
| JP | 5-73496 | 3/1993 |
| JP | 10-154127 | 6/1998 |
| JP | 2001-243185 | 9/2001 |
| JP | 2001-256135 | 9/2001 |
| JP | 2002-82906 | 3/2002 |
| JP | 2002-150163 | 5/2002 |
| JP | 2003067289 A * | 3/2003 |
| JP | 2004171438 A * | 6/2004 |

OTHER PUBLICATIONS

P. Tanner, S. A. MacKay, D. A. Stewart, and M. Wein. "A Multitasking Switchboard Approach to User Interface Management." Proceedings of SIGGRAPH86, Computer Graphics, 20 (4)- pp. 241-248.*

* cited by examiner

Dialogue example
   S: System message
   U: User message

S: Hello. This is Shinkansen train reservation service.
S: For which Shinkansen train you would like to make a reservation?

S: What is the date you wish?
U: April 25

S: What is the departure time?
U: 8 a.m.

S: Which station will you leave from?
U: Shin-Kobe

S: Which station is your destination?
U: Tokyo

S: Which type of Shinkansen will you use? Please select from "Nozomi," "Hikari," or "Kodama."
U: Nozomi S: Do you prefer non-smoking or smoking?
U: Non-smoking S: We will make a reservation for a non-smoking seat on the Nozomi No. 123 for April 25, 8:08a.m., departing from Shin-Kobe, arriving at Tokyo.
   Please wait for a moment.

S: During this wait time, you can change system attributes.
S: Do you want to change the speech speed?
U: A little faster S: Do you want to change speech volume?
U: No, I don't.

S: Speech is set at fast.

S: Shinkansen reservation has been completed.
S: Thank you for using our service.

 Wait time dialogue

*Fig. 2*

| Date and time | Search device | Info. acquisition time (min.) |
|---|---|---|
| 2003/3/25/08:30 | www.fujiair.com | 0:10 |
| 2003/3/25/09:10 | www.fujiair.com | 0:12 |
| 2003/3/25/12:20 | www.fujitravel.com | 0:30 |
| 2003/3/25/12:35 | www.fujitravel.com | 0:40 |
| 2003/3/25/12:45 | www.fujiair.com | 0:21 |
| ⋮ | ⋮ | ⋮ |

*Fig. 3A*

| Search device | Average acquisition time |
|---|---|
| www.fujiair.com | 14.3(s) |
| www.fujitravel.com | 35(s) |
| ⋮ | ⋮ |

*Fig. 3B*

| Time slot | Average acquisition time |
|---|---|
| 8:00 — 12:00 | 11(s) |
| 12:00 — 13:00 | 30.3(s) |
| ⋮ | ⋮ |

*Fig. 3C*

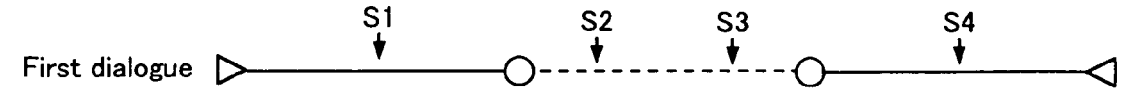
*Fig. 5A*
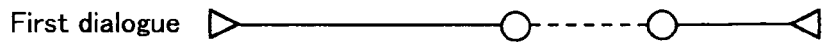
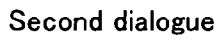
*Fig. 5B*
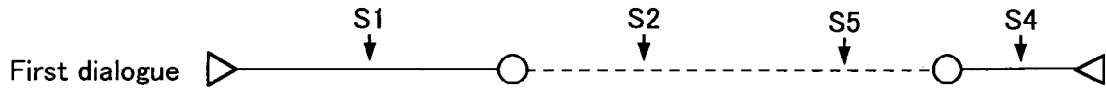
*Fig. 5C*
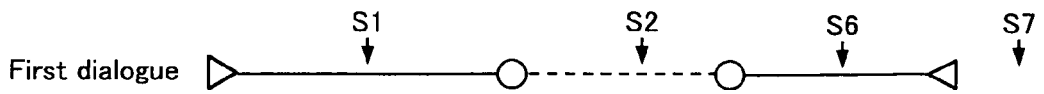
*Fig. 5D*

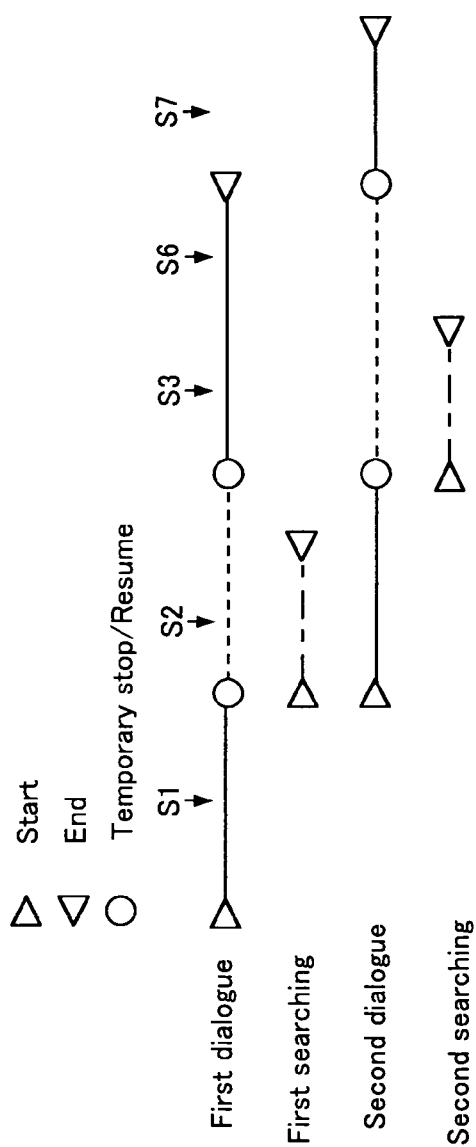
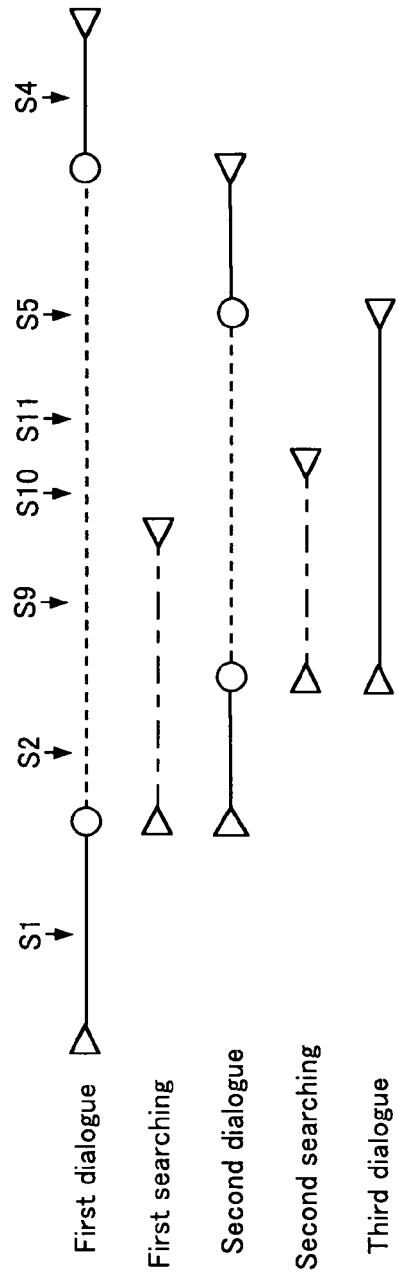
Fig. 6A
Fig. 6B

S1,S4

| Dialogue being executed | Execution state | Search processing |
|---|---|---|
| reservation.xml | Dialogue in progress | |

| Dialogue being executed | Execution state | Search processing |
|---|---|---|
| reservation.xml | Temporary stop | SR1 Awaiting response |
| update.xml | Dialogue in progress | |

| Dialogue being executed | Execution state | Search processing |
|---|---|---|
| reservation.xml | Temporary stop | SR1 Awaiting response |

| Dialogue being executed | Execution state | Search processing |
|---|---|---|
| reservation.xml | Temporary stop | |
| update.xml | Dialogue in progress | |

| Dialogue being executed | Execution state | Search processing |
|---|---|---|
| reservation.xml | Dialogue in progress | |
| update.xml | Temporary stop | |

| Dialogue being executed | Execution state | Search processing |
|---|---|---|
| update.xml | Dialogue in progress | |

| Dialogue being executed | Execution state | Search processing |
|---|---|---|
| reservation.xml | Dialogue in progress | |
| update.xml | Temporary stop | SR2 Awaiting response |

| Dialogue being executed | Execution state | Search processing |
|---|---|---|
| reservation.xml | Temporary stop | SR1 Awaiting response |
| update.xml | Temporary stop | SR2 Awaiting response |
| hotel.xml | Dialogue in progress | |

| Dialogue being executed | Execution state | Search processing |
|---|---|---|
| reservation.xml | Temporary stop | SR1 Awaiting response |
| update.xml | Temporary stop | |
| travel.xml | Dialogue in progress | |

| Dialogue being executed | Execution state | Search processing |
|---|---|---|
| reservation.xml | Temporary stop | |
| update.xml | Temporary stop | |
| travel.xml | Dialogue in progress | |

Fig. 8J

| User ID | Dialogue history |
|---------|------------------|
| user-A | reservation.xml;update.xml |
| ⋮ | ⋮ |

DIALOGUE APPARATUS FOR CONTROLLING DIALOGUES BASED ON ACQUIRED INFORMATION, JUDGMENT RESULT, TIME ESTIMATION AND RESULT TRANSMISSION

This is a continuation of International Application PCT/JP2003/004731, with an international filing date of Apr. 14, 2003.

BACKGROUND OF THE INVENTION

1. Field of the Invention

The present invention relates to technology for making dialogue between a person and computer more convenient.

In the present invention, the term "dialogue" includes voice dialogue and text dialogue, and also includes at least a message from a person and at least a message from a computer. Below, a message input by a person into a computer is called a "user message", and a message output from a computer is called a "system message".

2. Background Information

Recently, voice portals that provide some of the information on the World Wide Web by using a voice dialogue system have become more common. A voice portal often employs VoiceXML as a language for writing a dialogue scenario. A voice dialogue system employed for a voice portal and the like performs voice dialogue with a user, acquires information needed for a search process, and performs information searches using a database. During the time between a search request to a search system that includes a database and receipt of a response, a wait time of a few to dozens of seconds may occur. Particularly when information is acquired from a voice portal via the network, in addition to search time, network delay may also occur. To alleviate user stress during this wait time, in a conventional voice dialogue system, prompts appear to the effect that an information search is in progress, or advertising audio is played.

However, when just prompts or advertising audio are used, a user during wait time is simply listening to one-way system output. Thus the user does not use the connection time with the voice dialogue system effectively.

An object of the present invention is to provide technology for efficient utilization of connection time between a user and a dialogue system.

SUMMARY OF THE INVENTION

To solve the above problem, a first aspect of the present invention provides a dialogue apparatus for performing dialogues with a user-operated user terminal. This device comprises a dialogue unit for performing first and second dialogues with the user terminal; a control unit that judges whether to start the second dialogue during the first dialogue, and starts the second dialogue during the first dialogue in accordance with the judgment result; and a result transmission unit that transmits the first result, which is the result of the first dialogue, and the second result, which is the result of the second dialogue, to the user terminal.

A dialogue apparatus performs a first dialogue with a user and judges whether to start a second dialogue when user wait time occurs during the first dialogue. For example, when information necessary to further continue the first dialogue is to be acquired via a network during the first dialogue, wait time will occur. If the wait time is expected to be long, the second dialogue is made during the wait time. After this dialogue ends, the first dialogue is resumed. Thus, user wait time during the dialogue becomes shorter, and the user is able to utilize connection time more effectively.

A second aspect of the present invention provides a dialogue apparatus according to the first aspect, further comprising a first monitoring unit that monitors execution status for one or more information acquisition processes for acquiring information to be used for continuing a dialogue, and an estimation unit that before information acquisition processing starts estimates time necessary to acquire information. In this device, the control unit judges whether to start the second dialogue based on the estimated time estimated to be necessary for acquiring information to be used for continuing the first dialogue.

The dialogue apparatus performs a second dialogue if the wait time is relatively long, and does not perform a second dialogue if the wait time is short. This judgment can be performed by estimating time necessary to acquire information that became necessary during the first dialogue and judging whether such estimated time is longer than a predetermined threshold value T0.

A third aspect of the present invention provides a dialogue apparatus according to the second invention, further comprising a history unit for storing history of time needed to acquire information used for continuation of dialogue, wherein the estimation unit estimates time necessary to acquire information based on information acquisition time history.

Estimation of information acquisition time can be performed by accumulating a history of past information acquisition times and, for example, using the average value thereof as the estimated time.

A fourth aspect of the present invention provides a dialogue apparatus according to the second aspect, wherein the estimation unit requests an estimation of time necessary for an information search to the information search device that is to search for the information, and the estimation unit receives a response to the request from the information search device, and the control unit judges whether to commence the second dialogue based on the response.

An alternative method for estimation of information acquisition time is as follows. Prior to a request for search, request is made to an information search device that has an information search time estimation function for estimation of information acquisition time. The information search device calculates an estimated time based on the request, and responds to the dialogue apparatus. The dialogue apparatus, if the estimated time is long, requests information search and starts the second dialogue. Conceivable methods by which the information search device might estimate time include the information search device recording its own information search time history and calculating an estimate for information search time based on that history.

A fifth aspect of the present invention provides a dialogue apparatus according to the first aspect, further comprising a second monitoring unit that monitors the dialogue execution state. In this apparatus, the control unit performs one of the dialogues with the user terminal, and manages the dialogue execution state so that the other dialogue is in a temporary stop state.

The control unit monitors which dialogues a dialogue apparatus is executing. If both first and second dialogues are being executed, either of the first and second dialogues is made with the user terminal and the other dialogue is put in a temporary stop state. For example, during temporary stop of the first dialogue, the second dialogue is started. As a further example, during wait time for acquisition of the information for the first dialogue, the first dialogue is temporarily stopped and the second dialogue is started.

A sixth aspect of the present invention provides a dialogue apparatus according to the fifth aspect, further comprising a first monitoring unit that monitors execution state of one or more information acquisition processes for acquiring information to be used in the continuation of the dialogue being executed. In this device, the control unit selects a dialogue and/or switches between dialogues with the user terminal based on dialogue execution state and on information acquisition processing execution state.

For example, if during the first dialogue it is found that additional information is needed to continue dialogue, during such information acquisition processing the first dialogue temporarily stops and the second dialogue is then started. If the information acquisition processing ends during the second dialogue, the second dialogue may be temporarily stopped to allow the first dialogue to resume, or resumption of first inactivation can occur upon end of the second dialogue. Conversely, in cases where the second dialogue has ended before the information acquisition processing ends, the first dialogue may start upon end of the information acquisition processing or another, third dialogue may be started.

In the dialogue apparatus of a sixth aspect of this invention, when the information acquisition processing for acquiring information to be used for continuing the first dialogue has started during the first dialogue, the control unit can temporary stop the first dialogue and start the second dialogue. For example, when during the first dialogue additional information is found to be necessary to continue the dialogue, the control unit temporarily stops the first dialogue and starts the second dialogue. The control unit can use estimated time to judge whether the first dialogue should be temporarily stopped. More specifically, if the estimated time is at least a threshold value T0, the control unit temporarily stops the first dialogue and starts the second dialogue.

A seventh aspect of the present invention provides a dialogue apparatus according to the sixth aspect, wherein the control unit further records additional information relating to the temporarily stopped dialogue executed up to stop time, and resumes the dialogue based on the stored information and on information acquired for continuing the dialogue.

When the first dialogue is to be temporarily stopped, the control unit records information acquired during the dialogue and information indicating how much of the dialogue was made. Based on such information and the acquired information, the first dialogue resumes.

In the dialogue apparatus of the seventh aspect, after another dialogue made with the user terminal temporarily stops or ends, the control unit can cause the temporarily stopped dialogue to resume. If the second dialogue is still being executed when the necessary information has been acquired, there are two conceivable methods for resuming the first dialogue. The first one is to wait for the end of the second dialogue before resuming the first dialogue. The second one is to resume the fist dialogue by temporarily stopping the second dialogue when the information has been acquired. In this second method, the second dialogue may resume, for example, after the first dialogue ends.

An eighth aspect of the present invention provides a dialogue apparatus according to the first aspect, further comprising a dialogue history storage unit that correlates user identifiers identifying user terminal with identifiers for dialogues being executed with the user terminals and stores the same. In this device, the control unit selects the second dialogue from among dialogues other than any dialogues being executed with the user terminal.

A dialogue made by a user with a dialogue apparatus is recorded and stored, and while that dialogue is temporarily stopped, a different dialogue is selected as the second dialogue. Two different kinds of dialogue storage units can be provided so that relatively short dialogues for execution while a dialogue is temporarily stopped may be stored in another dialogue storage unit as wait time dialogues. For example, if the first dialogue temporary stop time is long, consecutive execution of dialogues for wait time will save the user from waiting.

A ninth aspect of the present invention provides a dialogue program for computer execution of a dialogue with a user-operated user terminal. The program includes the following steps: a first dialogue step for performing first and second dialogues with the user terminal; a control step for judging whether to start the second dialogue during the first dialogue and starting the second dialogue during the first dialogue in accordance with the judgment result; and a result transmission step for transmitting first result (being first dialogue result) and the second result (being second dialogue result) to the user terminal.

A tenth aspect of the present invention provides a dialogue method for computer dialogue with a computer-operated user terminal, comprising: a dialogue process for performing first and second dialogues with the user terminal; a control process for judging whether to start the second dialogue during the first dialogue and starting the second dialogue during the first dialogue in accordance with the judgment result; and a result transmission process for transmitting the first result (being the first dialogue result) and the second result (being the second dialogue result) to the user terminal.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 2 is a diagram for explaining an example when first and second dialogues are made concurrently;

FIG. 3A is a conceptual diagram for explaining information stored in a time history DB 23;

FIG. 3B is a diagram for explaining a method for calculating average information acquisition time for each search device;

FIG. 3C is a diagram for explaining a method for calculating average acquisition per time slot;

FIG. 5 is a diagram (1) for explaining a method for managing dialogue processing by the dialogue management unit of FIG. 1;

FIG. 6 is a diagram (2) for explaining a method for managing dialogue processing by the dialogue management unit of FIG. 1;

FIGS. 7A-7F are diagrams (1) for explaining a transition of the monitoring table of FIG. 1 in accordance with dialogue execution state and search request execution state;

FIGS. 8G-8J are diagrams (2) for explaining a transition of the monitoring table of FIG. 1 in accordance with dialogue execution state search request execution state;

DETAILED DESCRIPTION OF THE PREFERRED EMBODIMENTS

First Embodiment

1. Overall Configuration

Figure 1:
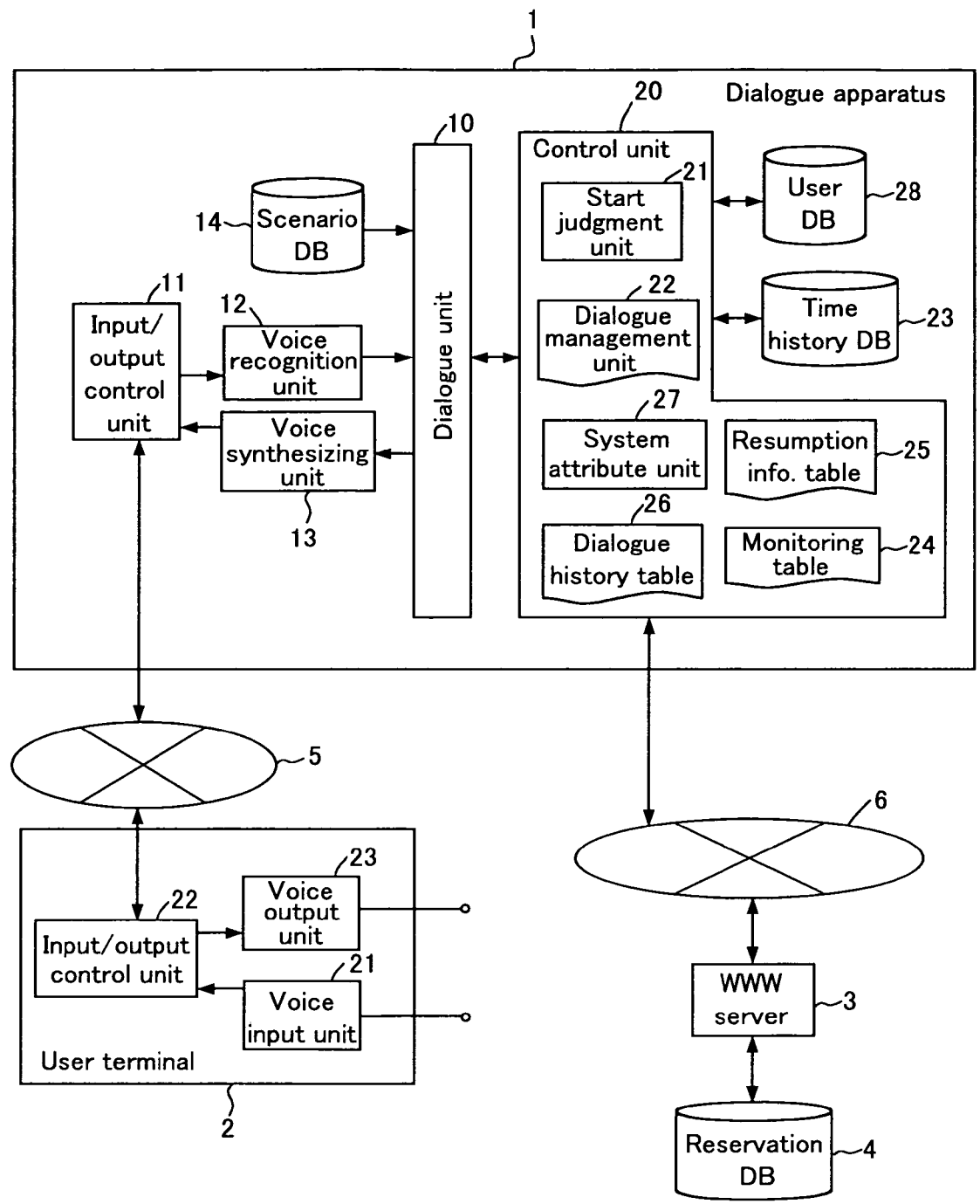
FIG. 1 is a functional block diagram of a dialogue apparatus 1 relating to a first embodiment of the present invention.

FIG. 1 shows a functional block diagram of a dialogue apparatus 1 relating to a first embodiment of the present invention. The dialogue apparatus 1 performs dialogues with a user-operated user terminal 2 via a network 5. The dialogue apparatus 1 is connected to a network server such as a www server 3 via a network 6, and via the www server 3 acquires information stored in a reservation database (DB) 4. Herein below, to simplify explanation, voice dialogue will be used as the example.

The dialogue apparatus 1 performs voice dialogues with a user terminal 2 (described below in (2-1) "Dialogue processing"). The dialogue apparatus 1 judges whether to start the second dialogue during wait time arising in the first dialogue being executed with the user terminal 2 (described below in (2-2) "Start judgment processing"). In accordance with the judgment result, the second dialogue is started and a plurality of dialogues are executed concurrently. However, execution state of such plurality of dialogues is managed so that one of such dialogues is made with a user terminal and the other dialogue is put in a temporary stop state (described below in (2-3) "Dialogue management processing"). The dialogue apparatus 1 can acquire user-related information using a dialogue made during wait time (described below in (2-4) "System attribute update processing"). Dialogue results are transmitted to the user terminal 2 when each dialogue respectively ends or all dialogues end.

FIG. 2 is an explanatory diagram showing an example when both first and second dialogues are being made concurrently between the dialogue apparatus and the user terminal 2. In this example, the first dialogue relates to reserving a ticket on a means of transportation and the second dialogue concerns dialogue attributes such as speech speed and volume of the dialogue apparatus 1. During wait time during the first dialogue for referral to a database of such transportation means, the second dialogue is executed. After the second dialogue ends, the first dialogue resumes. Thus a user can utilize connection time more effectively due to shorter dialogue wait time. Further, the dialogue apparatus 1 can use this wait time to acquire dialogue attributes for each user.

(2) Dialogue Apparatus (2-1) Dialogue Processing

The dialogue apparatus 1 performs voice dialogue with the user terminal 2. Dialogue scenarios needed for dialogue processing are stored in a scenario DB 14. Dialogue scenarios are, for example, written in VoiceXML and identified by a scenario ID. A voice signal input from a mike or the like to a voice input unit 21 of the user terminal 2 is received from an input/output control unit 22 as a voice user message by an input/output control unit 11 of the dialogue apparatus 1 via the network 5. The voice user message is converted by a voice recognition unit 12 from voice data to text data. Based on the user message converted into text data, a dialogue unit 10 performs dialogue processing in accordance with one of the scenarios and decides on a system message for output. The system message output from the dialogue unit 10 is converted by a voice synthesizing unit 13 from text data into voice data, and transmitted from the input/output control unit 11. The voice system message is received at the input/output control unit 22 of the user terminal 2 and output from a voice output unit 23 into an output device such as a speaker.

(2-2) Start Judgment Processing

A control unit 20 of the dialogue apparatus 1 judges whether to start another dialogue while a dialogue is being executed. More specifically, a start judgment unit 21 of the control unit 20 estimates wait time arising during the dialogue due to search request. The search request is a process for performing a request to an outside search device (in this embodiment, the www server 3) for a search for information to be used for continuing a dialogue. For example, when a dialogue is made for the purpose of making a flight ticket reservation, information regarding availability of a flight desired by a user is acquired from a reservation DB 4. In such a case, the start judgment unit 21 estimates information acquisition time needed for a response to a search request and judges whether to start another dialogue based on the estimated time. For example, the dialogue apparatus 1 executing the first dialogue starts the second dialogue when the wait time is relatively long, and does not start the second dialogue when the wait time is short. This judgment can be made based on whether the estimated time is longer than a predetermined threshold value T0.

(2-2-1) Calculation of Estimated Time using Average Value

Methods for calculating estimated time include using an average value for past information acquisition time as estimated time. There is provided a time history DB 23 in which history of information acquisition time is stored, and the average for the stored information acquisition time is used as estimated time. FIG. 3A is a conceptual diagram for explaining information stored in the time history DB 23. As illustrated in FIG. 3A, the time history DB 23 can store, in addition to information acquisition times, date and time of search request and search device identifiers.

FIGS. 3B, C are explanatory diagrams illustrating one example of finding average information acquisition time (average acquisition time) using the time history DB 23 as shown in FIG. 3A. FIG. 3B illustrates a method for finding average information acquisition time for each search device. For example, in this drawing, average acquisition time when a search has been requested of the search device www.fujiair-.com is 14.3 seconds. So when a search request has been made during a dialogue to this search device, the estimated time is 14.3 seconds. FIG. 3C illustrates a method for calculating average acquisition time depending on time of day. For example, in this drawing, the average acquisition time for search between 12:00 p.m. and 1:00 p.m. is 30.3 seconds. So if a search is requested between 12:00 p.m. and 1:00 p.m., the estimated time is 30.3 seconds. Average acquisition time for each search device, as illustrated in FIGS. 3B, C and average acquisition time depending on time of day can be calculated each time a search is requested. Alternatively, calculation results are maintained and these can be referred to promptly upon request for a search. In such a case, calculation results can be updated each time a new search result is acquired.

(2-2-2) Acquisition of the Estimated Time from the Search Device

Figure 4:
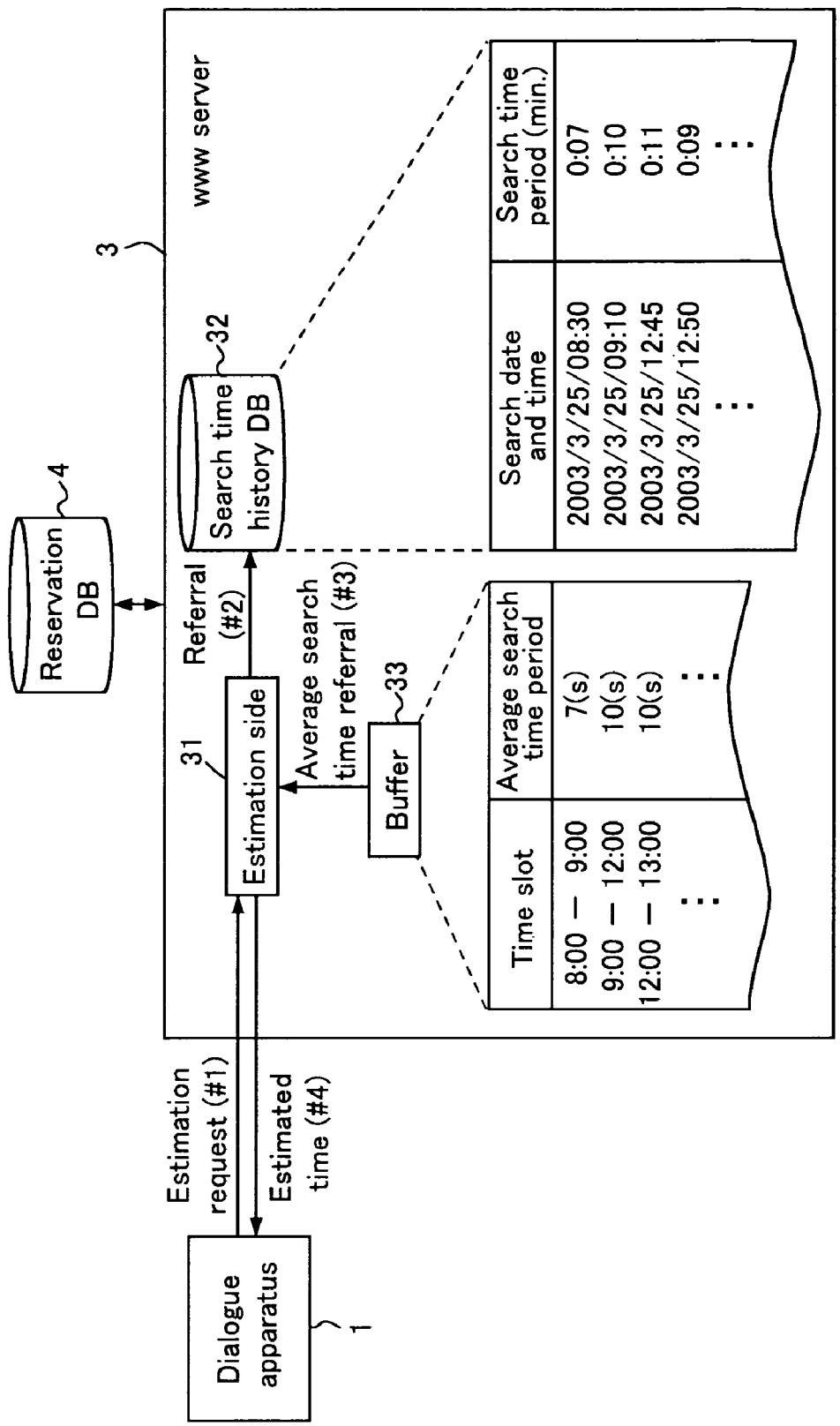
FIG. 4 is a diagram for explaining a method for acquiring estimated time.

The start judgment unit 21 may be configured to acquire from the search device estimated time necessary to acquire a search result. FIG. 4 is a diagram for explaining a method for acquisition of estimated time in this case. The start judgment unit 21 performs a request to the search device (the www server 3 in this case) for estimate of time needed for information search. This request is made prior to search request. The estimation unit 31 of the www server 3 that has received the request refers to a search time history DB 32 (#2) and calculates average search time depending, for example, on time of day. In the search time DB 32, search date and time information and search time of day information are correlated and stored. The calculation result is temporarily held in a buffer 33. Thereafter, an average search time for the time of day at which a search time estimate request was received is read from the buffer 33 (#33) and transmitted to the start judgment unit 21. When this value exceeds the threshold value T0, the start judgment unit 21 judges that another dialogue is to be started. It should be noted that methods for estimating average search time by the search device are not limited to calculating average value depending on time of day.

(2-3) Dialogue Management Processing (2-3-1) Dialogue Management

The control unit 20, when the first and second dialogues are being executed, manages such dialogues so that one of the two dialogues is made with the user terminal 2. The other dialogue is put in a temporary stop state. More specifically, a dialogue management unit 22 of the control unit 20 monitors dialogue execution state and search execution state, and the monitoring result is temporarily stored in the monitoring table 24. Further, based on the monitoring table 24, the dialogue management unit 22 manages a plurality of dialogues so that one dialogue is made with the user terminal.

FIGS. 5 and 6 are diagrams for explaining a management method for dialogue processing performed by the dialogue management unit 22. FIGS. 5A, C, D illustrate management methods when the second dialogue is made during the search executed during the first dialogue processing. FIG. 5B illustrates a case where a second dialogue is not made because estimated time is short.

FIGS. 5A, B, D will be described in further detail. Let us consider the example of a case where during the first dialogue it is found that additional information is needed necessary to continue the first dialogue. First, a request for search of such information is made, the first dialogue is temporarily stopped during search result wait time and the second dialogue is caused to start (state S2). When the second dialogue ends before receipt of search response (state S3), receipt of search response is awaited before commencing the first dialogue (state S4) (FIG. 5A). Alternatively, a different, third dialogue may be started. Conversely, when information acquisition processing ends during the second dialogue, the end of second dialogue may be awaited (state S5) before resuming the first dialogue (state S4) (FIG. 5C), or the first dialogue may be resumed after the second dialogue has been temporarily stopped (state S6) (FIG. 5D).

As shown in FIG. 5, there are two conceivable methods for resumption of the first dialogue when the second dialogue is still being executed after a search response regarding information for the first dialogue. The first is to wait for end of the second dialogue before resuming the first dialogue. The second is to temporarily stop the second dialogue at receipt of response and then resume the first dialogue. For this second method, the second dialogue may resume, for example, after the first dialogue ends.

FIG. 6A is a diagram for explaining one example of management method when it is found during the second dialogue that information is needed to continue the second dialogue. The dialogue management unit 22, just as with the first search processing for the first dialogue, can manage the second search processing for the second dialogue. If the first search processing has already ended during wait for a response with respect to the second searching for information necessary for the second dialogue, the first dialogue is caused to resume (state S8), and end of the first dialogue is awaited (state S9) before the second dialogue is resumed and ended (state S7).

FIG. 6B is an explanatory diagram showing one example of a management method for further executing a third dialogue processing during the second search processing. As with the second dialogue executed during the first dialogue, the third dialogue can be executed during the second dialogue. When wait for a first search response and wait for a second search response overlap (state S9), a third dialogue processing is executed. Even if the first search ends (state S10) and then the second search ends (state S11), the second and first dialogue processes wait for the third dialogue processing to end before resuming (states S5, S4). The above management method is one example illustrating that one dialogue processing is performed with the user terminal 2 based on the relationship of the dialogue processing being executed and wait time for the corresponding search response.

FIGS. 7, 8 are explanatory diagrams showing transitions undergone by the monitoring table 24 in accordance with dialogue execution state and search request execution state. The monitoring tables 24 show the states S1 through S11 in FIGS. 5, 6. Each monitoring table 24 includes the following information:

a) scenario ID of the dialogue scenario that the dialogue apparatus is executing at that time;

b) whether the dialogue scenario being executed is in a temporary stop or dialogue state; and c) identifier for search processing executed for each dialogue scenario and for which a response is awaited.

This drawing shows a case where the identifier for the first dialogue scenario is the reservation.xml and the identifier for the second dialogue scenario is update.xml.

(2-3-2) Resumption of Dialogue

The dialogue management unit 22 temporarily stores in a resumption information table 25 resumption information needed to resume a stopped dialogue. Resumption information is information used for continuing a stopped dialogue. Resumption information can include information of how much of the dialogue has been executed and search results with respect to a search request. Resumption information is given to the dialogue unit 10, and depending on how much of the dialogue has been executed and on the search results, the next system message is output.

(2-3-3) Dialogue History

Figures 9, 10:
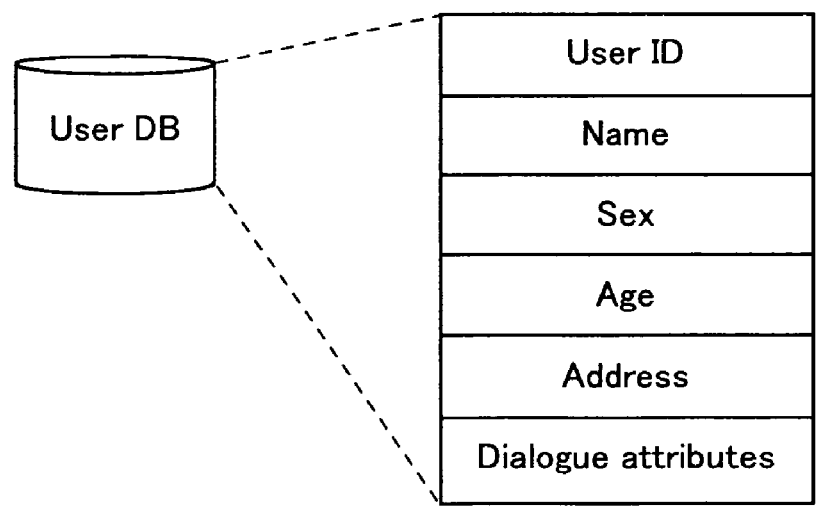
FIG. 9 is a conceptual diagram for explaining the dialogue history table of FIG. 1.
FIG. 10 is a conceptual diagram for explaining information stored in a user DB.

The dialogue management unit 22 manages dialogues being executed at each user terminal 2. FIG. 9 is a conceptual diagram for explaining a dialogue history table 26. The dialogue history table 26 temporarily stores a user ID, which is an identifier for the user terminal 2, and a scenario ID for a dialogue scenario being executed with the user terminal 2. When wait time arises, the dialogue management unit 22 refers to the dialogue history table 26 and specifies the dialogue scenario being executed with the user terminal 2.

Thereafter, a dialogue scenario not being executed by the user terminal 2 is selected from the scenario DB 14. This saves a user from repeating the same dialogue.

Two types of scenario DBs 14 may be provided: one DB may store relatively short scenarios for execution while a dialogue is temporarily stopped as dialogue scenarios for wait time. For example, if wait time is long, dialogue scenarios for wait time are executed one after another, thereby preventing the same dialogue from being repeated with a user and facilitating selection of dialogue scenario for wait time.

(2-4) System Attribute Changing Processing

A system attribute unit 27 of the control unit 20 acquires user-related information by execution of a wait time dialogue scenario and stores such information in a user DB 28. FIG. 10 is a conceptual diagram for explaining information stored in the user DB 28. In the user DB 28, in addition to user ID, personal information such as name and sex and dialogue attributes may be stored. Dialogue attributes include, for example, system message output speed, system message volume and gender of synthesized voice. What information is to be acquired depends on how a wait time scenario has been created and no particular limitations are placed thereupon. For example, if a wait time dialogue scenario as shown in the above FIG. 2 is used, dialogue attributes are acquired. Information stored in the user DB 28 may be used when a dialogue with the user terminal 2 is to be made or when selecting a wait time dialogue scenario.

(3) Processing Flow

Figure 11:
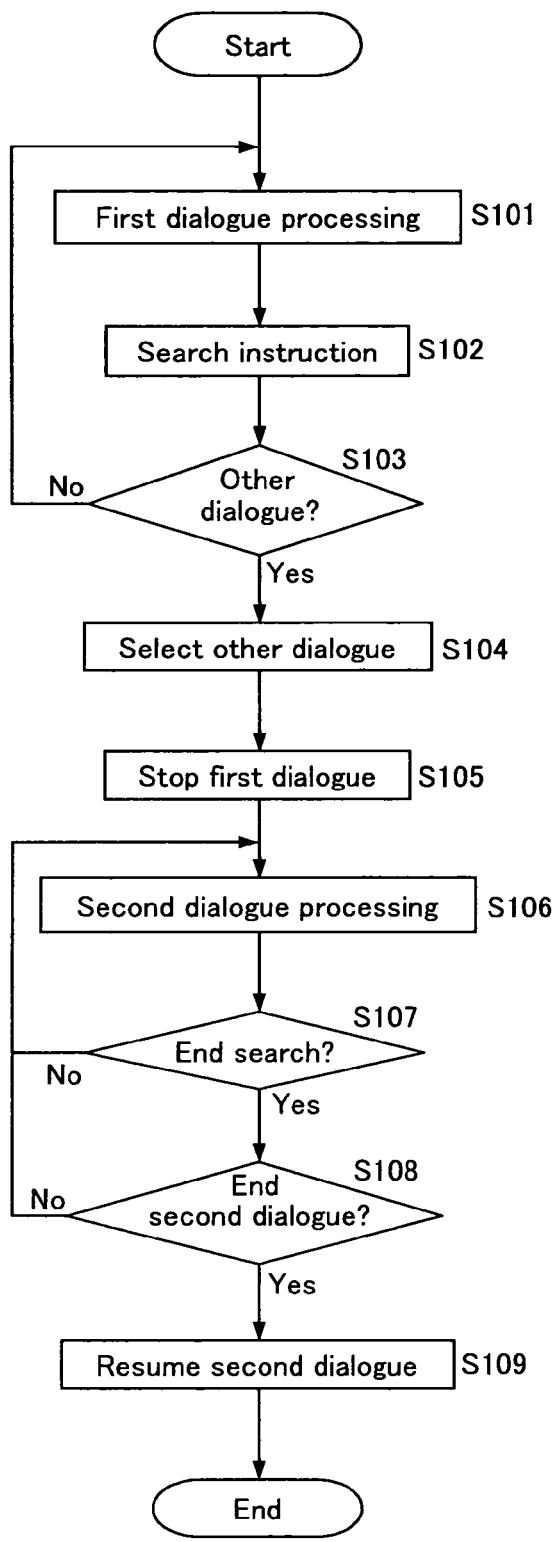
FIG. 11 is a flowchart illustrating one example of processing flow by the dialogue apparatus of FIG. 1.

FIG. 11 is a flowchart illustrating one example of the processing flow performed by the dialogue apparatus 1. To simplify the explanation, this drawing will address a case where a second dialogue starts during an information search taking place during a first dialogue. Further, first dialogue resumption timing will be explained using as an example a case of resumption after information acquisition and end of second dialogue.

Step S101:

First, a dialogue unit 10 commences dialogue with a user terminal 2. The first dialogue processing is executed independently from this processing.

Step S102:

If during the first dialogue processing it becomes necessary to search for information needed to continue the first dialogue, search instructions are given from the dialogue unit 10 to the control unit 20. The dialogue management unit 22 of the control unit 20 performs a request to an outside search system for search of the information based on these instructions.

Step S103:

The control unit 20 judges whether to start another dialogue. More specifically, the start judgment unit 21 performs an estimate for time required for acquisition of the information being searched for, and if the estimated time is longer than the threshold value T0, it judges that another dialogue is to be started, and control proceeds to step S104. In all other cases, only the first dialogue is executed.

Step S104:

The control unit 20 selects from the dialogue scenario DB 14 a dialogue to be made during temporary stop of the first dialogue. More specifically, the dialogue management unit 22 refers to the dialogue history table and selects a second dialogue other than a dialogue already being executed.

Step 105:

The dialogue management unit 22 of the control unit 20 gives instruction to the dialogue unit 10 for a temporary stop of the first dialogue processing. The dialogue management unit 22 correlates information necessary for resumption of the first dialogue, that is, information needed for continuation of the first dialogue, with a first dialogue scenario identifier and stores the same in the resumption information table.

Step S106:

The dialogue management unit 22 instructs the dialogue unit 10 to start the second dialogue processing.

Step S107, 108:

The dialogue management unit 22 receives a response to the search request ("Yes" of S107), and if the second dialogue processing ends ("Yes" of S108), control proceeds to step S1109. If the second dialogue processing has not ended despite receipt of search result, the second dialogue processing is executed ("No" of S108).

Step S109:

The dialogue management unit 22 gives to the dialogue unit 10 the information written in the resumption information table and the search result, and the first dialogue is resumed.

With this processing, a user may effectively utilize wait time that arises during the first dialogue by performing another dialogue. Alternatively, the dialogue system may acquire user-related information by means of wait time dialogue.

Other Embodiments (A) Explanation of the first embodiment above was made using as an example a voice dialogue system, but the present invention may also be used for text dialogue. Text dialogue may take the form of alternating system message and user message, that is, when a system message is output, a user message is input in response thereto. Further, it may take a form such that in response to a plurality of system messages output on one screen, a plurality of user messages is input.

(B) The above first embodiment illustrates a case where dialogue scenarios are on the dialogue apparatus 1, but some or all of the dialogue scenarios may be on another computer to which the dialogue apparatus 1 can be connected.

Figure 12:
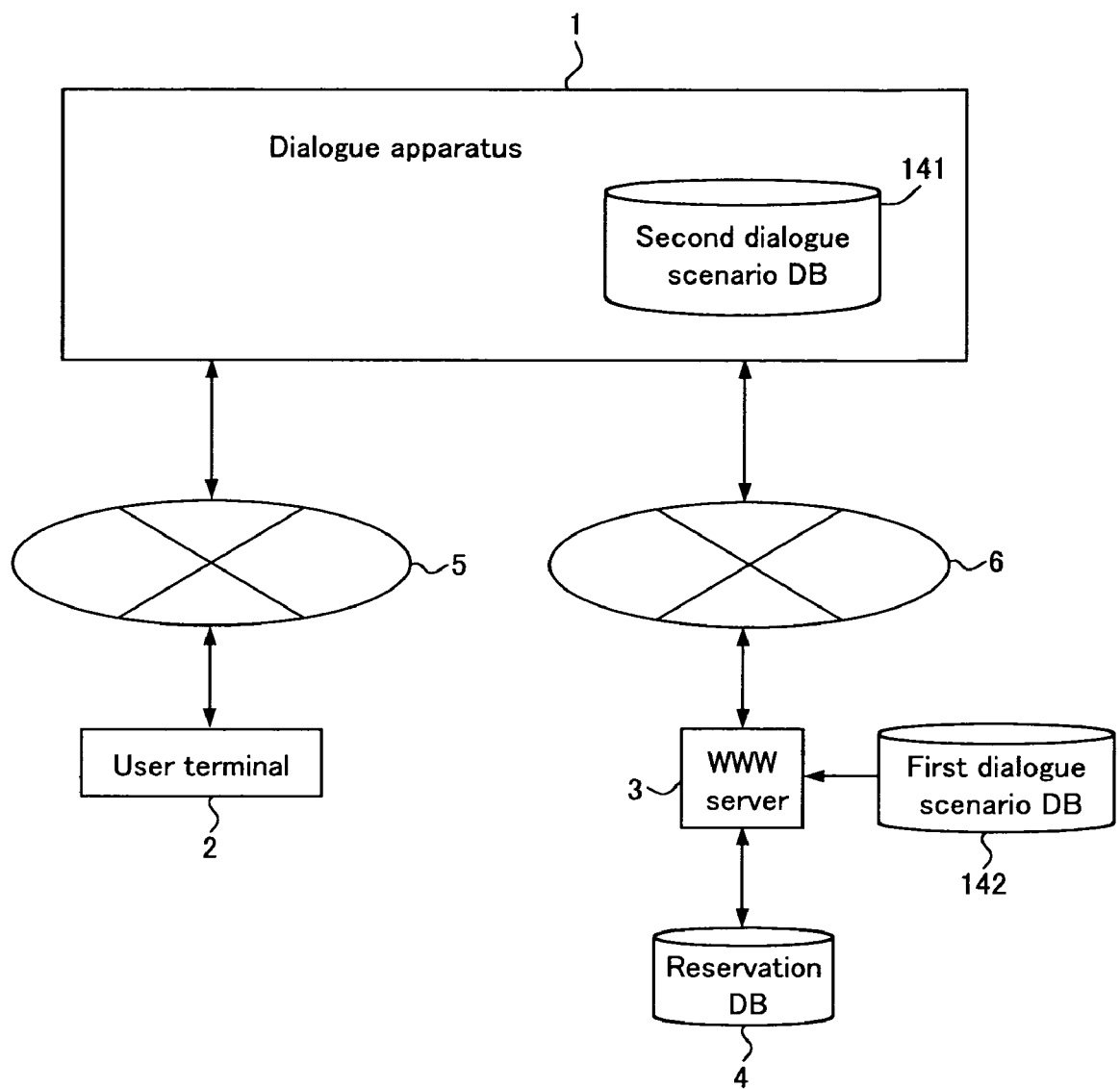
FIG. 12 is an overall block diagram of a dialogue system including a dialogue apparatus relating to another embodiment of the present invention.

FIG. 12 illustrates an overall block diagram of a case where a wait time scenario DB 141 is provided on the dialogue apparatus 1 and a first dialogue scenario DB 142 is provided on a computer other than the dialogue apparatus 1. The wait time scenario DB 141 is a database in which wait time scenarios for execution during wait time are stored. The first dialogue scenario DB 142 is a database for storing some or all of the scenarios other than wait time scenarios. There may be one or more first dialogue scenario DBs 142. The dialogue scenario DBs 142 may be provided on respective separate computers. The functional configuration of the dialogue apparatus 1 is identical to that of the first embodiment (not shown in the drawings), except that the wait time scenario DB 141 is provided in place of the scenario DB 14.

In this case, the dialogue apparatus 1 acquires a dialogue scenario from one of the first dialogue scenario DBs 142 and executes the same. During such execution, a wait time scenario is read from the wait time scenario DB 141.

Figure 13:
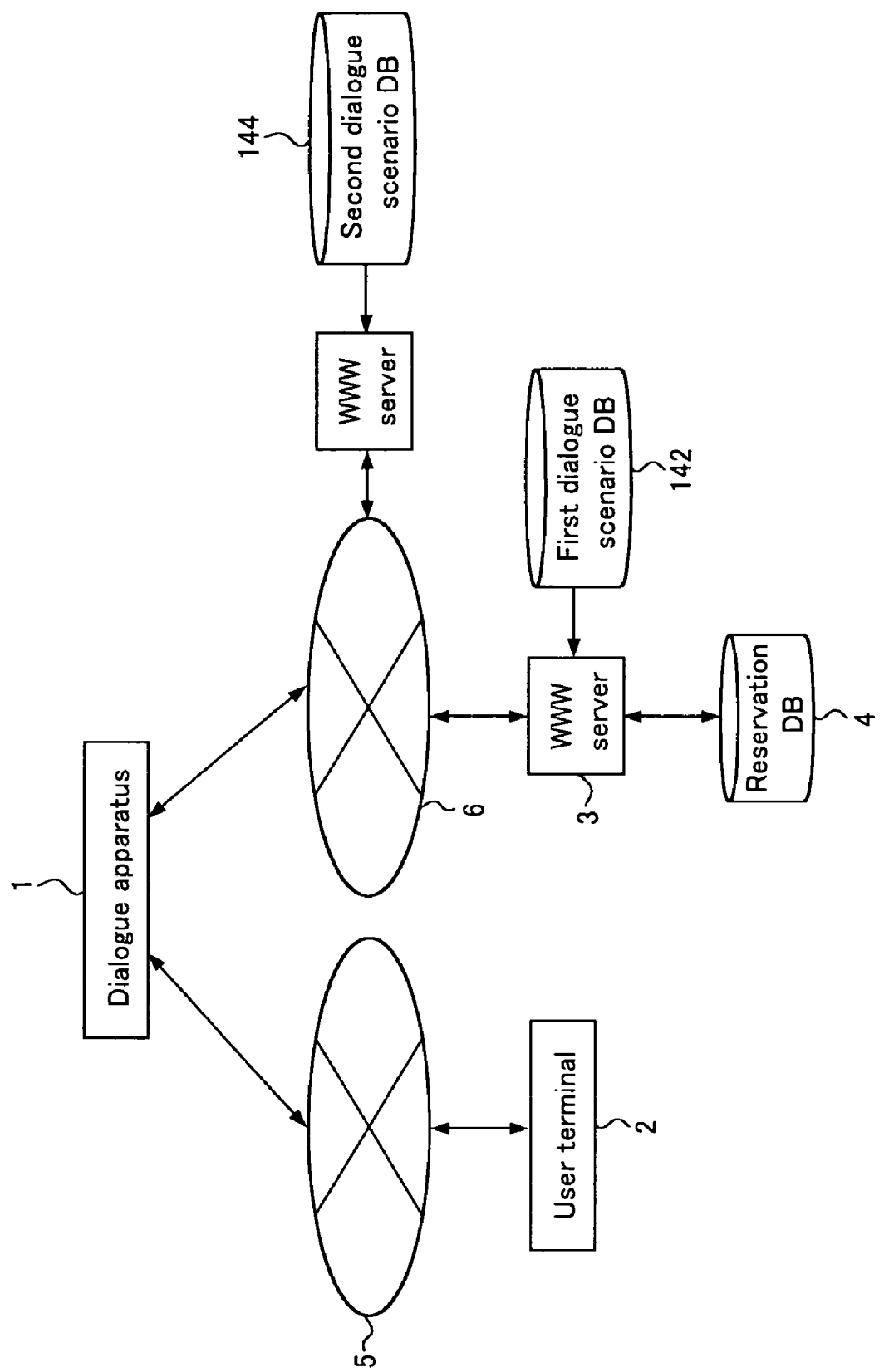
FIG. 13 is an overall block diagram of a dialogue system including a dialogue apparatus relating to yet another embodiment of the present invention.

FIG. 13 illustrates the overall configuration in a case where a first dialogue scenario DB 143 and a second dialogue scenario DB 144 are respectively provided on computers other than the dialogue apparatus 1. In each of the first dialogue scenario DB 143 and the second dialogue scenario DB 144, at least one dialogue scenario is stored. The dialogue apparatus 1 has the same functional configuration with that of the first embodiment (not shown in the drawings) with the exception that in place of having the scenario DB 14, dialogue scenario ID and dialogue scenario address are stored in databases. A dialogue scenario to be executed is acquired by accessing a stored address. However, because it is preferable that a dialogue to be executed during wait time be short, it is preferable that one of these databases be a database where dialogue scenarios are stored. It is also preferable to correlate with a dialogue scenario ID for a dialogue scenario having a length suitable as a wait time dialogue scenario, and to store a wait time scenario mark.

(C) The present invention includes a dialogue program for executing the above dialogue method on a computer and computer readable recording media on which such a dialogue program is recorded. Recording media include a flexible disk, hard disk, semiconductor memory, CD-ROM, DVD, and magneto-optic disc (MO).

Figure 14:
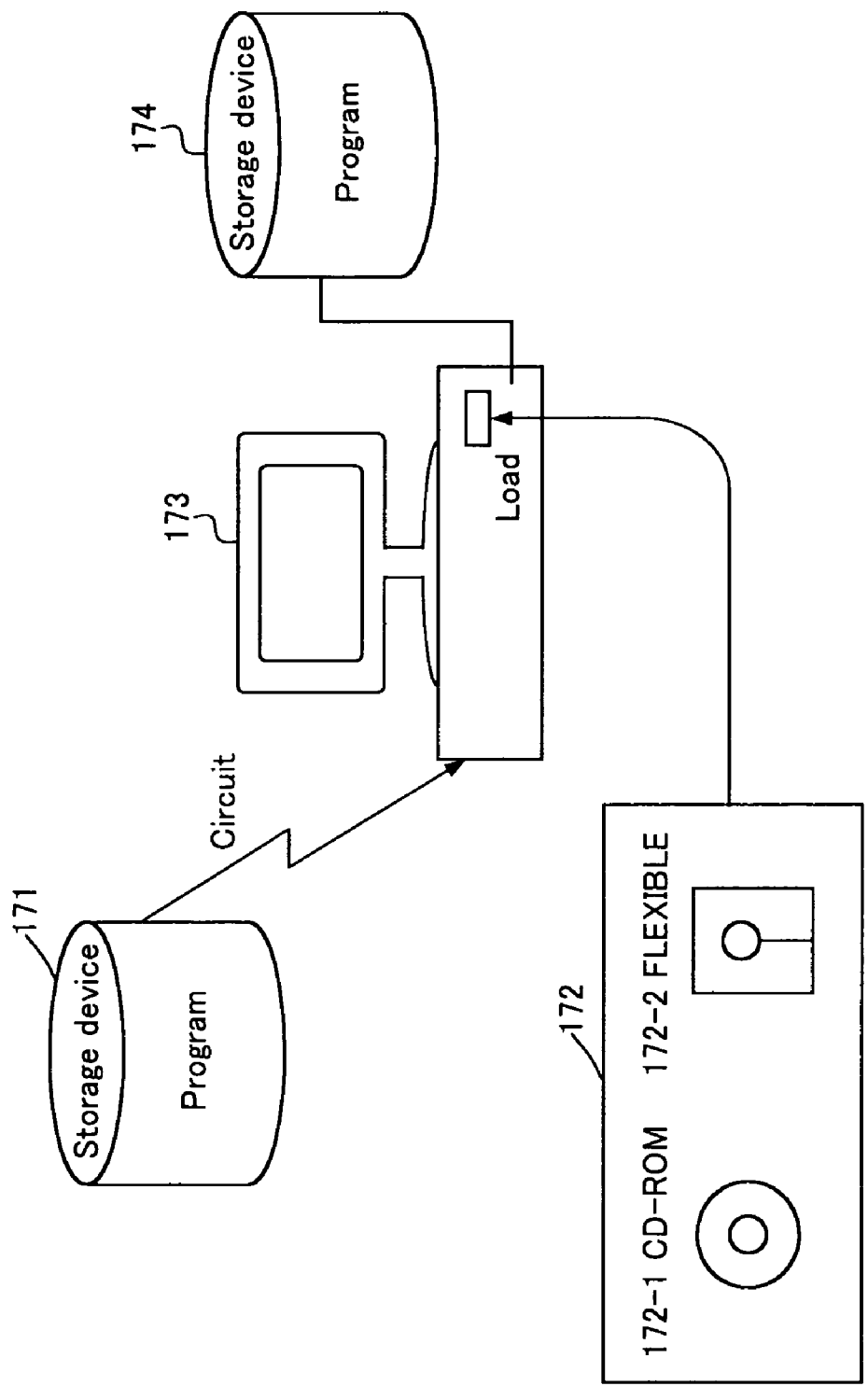
FIG. 14 is a diagram for explaining computer readable recording media on which the program is stored.

As illustrated in FIG. 14, computer readable recording medium on which the dialogue program is recorded may be on a computer 173 that executes the dialogue program or it may be elsewhere. That is, the recording media on which the dialogue program is stored may be a portable recording media 172 such as a CD-ROM 172-1, flexible disk 172-2 or the like, or another recording device 171 provided at the end of a communication line, or a recording medium 174 such as a hard disk, RAM or the like of the computer 173. When a program is to be executed, it is loaded on the computer 173 and executed on the main memory.

Computer readable recording media on which data is stored such as processible information generated by the dialogue apparatus relating to an embodiment of the present invention, as illustrated in FIG. 14, may be on the computer 173 that executes the dialogue program or it may be elsewhere. That is, the recording medium on which the dialogue program is stored may be a portable recording media 172 such as a CD-ROM 172-1, flexible disk 172-2 or the like, or another recording device 171 provided at the end of a communication line, or a recording medium 174 such as a hard disk, RAM or the like of a computer 173. Data stored on such recording media is read by the computer 173 that executes the dialogue programs.

This application claims priority to Japanese Patent Application No. PCT/JP2003/004731. The entire disclosure of Japanese Patent Application No. PCT/JP2003/004731 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A dialogue apparatus for performing dialogues with a user terminal operated by a user, comprising:
    a dialogue unit that performs a first and second dialogue with the user terminal;
    a control unit that judges whether to start the second dialogue during the first dialogue, and starts the second dialogue during the first dialogue in accordance with the a judgment result; and, that accomplishes both the first dialogue and the second dialogue to obtain respectively a first result and a second result, the first result being a result of the accomplished first dialogue, the second result being a result of the accomplished second dialogue;
    a first monitoring unit that monitors execution states of one or more information acquisition processes for acquiring information to be used for continuing the first dialogue being executed;
    an estimation unit that, for continuing the first information acquisition process, estimates time necessary to acquire the information to be used for continuing the first dialogue being executed; and
    a result transmission unit that transmits the first and the second results to the user terminal respectively or together;
    wherein the control unit initiates the second dialogue when judging to start the second dialogue based on the estimated time.

2. The dialogue apparatus according to claim 1, further comprising a history unit in which history of time required for acquiring information used for continuing a dialogue is stored,
    wherein the estimation unit estimates time necessary to acquire information based on information acquisition time history.

3. The dialogue apparatus according to claim 1, wherein the estimation unit requests an estimation of time necessary to acquire information from an information search device that executes the information acquisition process for acquiring the information, and receives a response to the request from the information search device, and the control unit judges whether to start the second dialogue based on the response.

4. The dialogue apparatus according to claim 1, further comprising a second monitoring unit that monitors a dialogue execution state to perform one of the dialogues being executed with the user terminal,
    wherein the control unit manages the dialogue execution state to perform the dialogue and dialogue execution states to stop temporarily other dialogues.

5. The dialogue apparatus according to claim 4, wherein the control unit selects and/or switches to a dialogue with the user terminal based on the dialogue execution state and on the information acquisition processing execution state.

6. The dialogue apparatus according to claim 5, wherein the control unit further stores information relating to the temporarily stopped dialogue up to the time of stop, and resumes the dialogue based on the stored information and on information acquired for continuing the dialogue.

7. The dialogue apparatus according to claim 1, further comprising:
    a dialogue history storage unit that correlates a user identifier that identifies a user to use a user terminal and an identifier of the dialogue being executed with the user terminal and stores the same,
    wherein the control unit selects a second dialogue from among dialogues other than a dialogue being executed with the user terminal.

* * * * *